(12) United States Patent
Park et al.

(10) Patent No.: US 11,636,577 B2
(45) Date of Patent: Apr. 25, 2023

(54) METHOD AND APPARATUS WITH BLUR ESTIMATION

(71) Applicant: Samsung Electronics Co., Ltd., Suwon-si (KR)

(72) Inventors: Seong-Jin Park, Suwon-si (KR); Jiwon Baek, Hwaseong-si (KR); Seungju Han, Seoul (KR); Minsu Ko, Suwon-si (KR); Solae Lee, Suwon-si (KR); Hana Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 16/867,749

(22) Filed: May 6, 2020

(65) Prior Publication Data

US 2020/0410647 A1 Dec. 31, 2020

(30) Foreign Application Priority Data

Jun. 27, 2019 (KR) .................. 10-2019-0077117

(51) Int. Cl.
*G06K 9/00* (2022.01)
*G06T 5/00* (2006.01)
(Continued)

(52) U.S. Cl.
CPC ............ *G06T 5/003* (2013.01); *G06F 3/011* (2013.01); *G06T 7/337* (2017.01); *G06T 7/60* (2013.01); *G06V 40/169* (2022.01); *G06V 40/40* (2022.01); *G06T 2207/20084* (2013.01); *G06T 2207/30201* (2013.01)

(58) Field of Classification Search
CPC ........... G06T 5/003; G06T 7/337; G06T 7/60; G06T 2207/20084; G06T 2207/30201; G06T 3/40; G06T 7/11; G06T 7/136; G06T 7/62; G06F 3/011; G06F 21/32; G06V 40/169; G06V 40/40; G06V 10/82; G06V 40/45; G06V 10/25; G06K 9/6201
See application file for complete search history.

(56) References Cited

U.S. PATENT DOCUMENTS

2004/0120598 A1 6/2004 Feng
2007/0172141 A1* 7/2007 Bando .................. G06T 5/003
                                                     382/261
(Continued)

FOREIGN PATENT DOCUMENTS

AU    2014242689 A1 * 10/2015 ............. B42D 25/00
EP       3287943 A1 *  2/2018 ............. G06F 21/32
(Continued)

OTHER PUBLICATIONS

Face Liveness Detection with Feature Discrimination between Sharpness and Blurriness, Chun-Hsiao Yeh et al., IAPR, 2017, pp. 368-371 (Year: 2017).*

(Continued)

*Primary Examiner* — Jayesh A Patel
(74) *Attorney, Agent, or Firm* — NSIP Law (57) ABSTRACT

A processor-implemented method with blur estimation includes: acquiring size information of an input image; resizing the input image to generate a target image of a preset size; estimating a blur of the target image; and estimating a blur of the input image based on the size information of the input image.

28 Claims, 6 Drawing Sheets

(51) Int. Cl.
*G06T 7/33* (2017.01)
*G06F 3/01* (2006.01)
*G06T 7/60* (2017.01)
*G06V 40/16* (2022.01)
*G06V 40/40* (2022.01)

(56) References Cited

U.S. PATENT DOCUMENTS

| | | | |
|---|---|---|---|
| 2009/0080790 A1* | 3/2009 | Hasegawa | G06T 5/003 |
| | | | 382/260 |
| 2011/0090352 A1* | 4/2011 | Wang | H04N 5/23267 |
| | | | 348/208.6 |
| 2011/0090378 A1 | 4/2011 | Wang et al. | |
| 2013/0315499 A1* | 11/2013 | Ju | G06T 7/0002 |
| | | | 382/255 |
| 2014/0211065 A1* | 7/2014 | Sudheendra | H04N 5/2621 |
| | | | 348/333.02 |
| 2014/0269912 A1 | 9/2014 | Sullivan | |
| 2015/0043791 A1* | 2/2015 | Setlak | G06V 40/13 |
| | | | 382/124 |
| 2016/0110849 A1 | 4/2016 | Jain et al. | |
| 2017/0178296 A1 | 6/2017 | Li et al. | |
| 2018/0018501 A1* | 1/2018 | Mather | G06V 40/1376 |
| 2018/0157899 A1* | 6/2018 | Xu | G06N 3/0454 |
| 2018/0173980 A1* | 6/2018 | Fan | G06V 10/141 |
| 2018/0181796 A1* | 6/2018 | Wang | G06V 40/161 |
| 2018/0276489 A1* | 9/2018 | Xu | G06V 40/167 |
| 2019/0005603 A1* | 1/2019 | Chen | G06T 5/003 |
| 2019/0295223 A1* | 9/2019 | Shen | G06T 7/0002 |
| 2021/0082136 A1* | 3/2021 | Nikitidis | G06T 7/20 |

FOREIGN PATENT DOCUMENTS

| | | | | | |
|---|---|---|---|---|---|
| JP | 2005122688 A | * | 5/2005 | | G06K 9/00228 |
| JP | 2007184787 A | * | 7/2007 | | |
| JP | 2011217130 A | * | 10/2011 | | H04N 19/102 |
| JP | 2016167164 A | * | 9/2016 | | |
| KR | 20090072109 A | * | 2/2007 | | |
| KR | 20100109722 A | * | 11/2010 | | |

OTHER PUBLICATIONS

Face Spoof Detection Using Image Distortion Analysis and Image Quality Assessment, Shilpa Unnikrishnan et al, IEEE, 978-1-5090-3751-3, 2016, pp. 1-5 (Year: 2016).*
Face Liveness Detection Using Defocus, Sooyeon Kim et al, Sensors ISSN 1424-8220, 2015, pp. 1537-1563 (Year: 2015).*
An Overview of Face Liveness Detection, Saptarishi Chakraborty et al., IJIT, 2014, pp. 11-25 (Year: 2014).*
Face Liveness Detection with Component Dependent Descriptor, Jianwei Yang et al., IEEE, 978-1-4799-0310-8, 2013, pp. 1-6 (Year: 2013).*
Face/Fingerphoto Spoof Detection under Noisy Conditions by using Deep Convolutional Neural Network, Masakazu Fujio et al., BIOSTEC, 2018, pp. 54-62 (Year: 2018).*
Blur-Aware Image Downsampling, MatthewTrentacoste et al., EUROGRAPHICS, 2010, pp. 1-10 (Year: 2010).*
Toward a Comprehensive Face Detector in the Wild, Jianshu Li et al., IEEE, Jan. 2019, pp. 104-114 (Year: 2019).*
Lin, Chin-Teng et al., "An HVS-Directed Neural-Network-Based Image Resolution Enhancement Scheme for Image Resizing." *IEEE Transactions on fuzzy systems*, vol. 15, No. 4, 2007 (pp. 605-615).
Samadani, Ramin et al., "Representative Image Thumbnails: Automatic and Manual." In *Human Vision and Electronic Imaging XIII*, 2008 (pp. 1-13).
Trentacoste, Matthew et al., "Blur-Aware Image Downsampling." In *Computer Graphics Forum*, vol. 30, No. 2, 2011 (pp. 1-10).
Efrat, Netalee et al., "Accurate Blur Models vs. Image Priors in Single Image Super-Resolution." In *Proceedings of the IEEE International Conference on Computer Vision*, 2013 (pp. 1-8).

* cited by examiner

METHOD AND APPARATUS WITH BLUR ESTIMATION

CROSS-REFERENCE TO RELATED APPLICATIONS

This application claims the benefit under 35 USC § 119(a) of Korean Patent Application No. 10-2019-0077117 filed on Jun. 27, 2019 in the Korean Intellectual Property Office, the entire disclosure of which is incorporated herein by reference for all purposes.

BACKGROUND

1. Field

The following description relates to blur estimation technology.

2. Description of Related Art

In a user verification system, a computing apparatus may determine whether to allow an access to the computing apparatus based on verification information provided from a user. The verification information may include, for example, a password input from the user or biometric information of the user.

Technology for performing a liveness test through a blur estimation on an input image has been researched as a security method for a user verification system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with blur estimation includes: acquiring size information of an input image; resizing the input image to generate a target image of a preset size; estimating a blur of the target image; and estimating a blur of the input image based on the size information of the input image.

The acquiring of the size information of the input image may include acquiring size information of a region of interest (ROI) in the input image.

The estimating of the blur of the input image may include correcting the blur of the input image based on a ratio between the size information of the input image and size information of the target image.

Each of the size information of the input image and the size information of the target image may include an area, a height, and a width.

The method may further include: performing a liveness test on the input image based on a result of a comparison between the estimated blur of the input image and a threshold.

The threshold may adaptively vary based on the size information of the input image.

The liveness test may fail in receiving a verification, in response to the estimated blur of the input image being greater than or equal to the threshold. The liveness test may succeed in receiving the verification, in response to the estimated blur of the input image being less than the threshold.

The estimating of the blur of the input image may include correcting the blur of the input image by combining the size information of the input image and the estimated blur of the target image.

The estimating of the blur of the input image may include estimating the blur of the input image using a blur estimation model based on a neural network.

In another general aspect, a non-transitory computer-readable recording medium stores instructions that, when executed by a processor, cause the processor to perform the method of claim 1 described above.

In another general aspect, an apparatus with blur estimation includes: a memory storing computer-readable instructions; and one or more processors. In response to the instructions being executed by the one or more processors, the one or more processors are configured to: acquire size information of an input image; resize the input image to generate a target image of a preset size; estimate a blur of the target image; and estimate a blur of the input image based on the size information of the input image.

The one or more processors may be further configured to acquire the size information of the input image by acquiring size information of a region of interest (ROI) in the input image.

The processor may be further configured to estimate the blur of the input image by correcting the blur of the input image based on a ratio between the size information of the input image and size information of the target image.

Each of the size information of the input image and the size information of the target image may include an area, a height, and a width.

The one or more processors may be further configured to perform a liveness test on the input image based on a result of a comparison between the estimated blur of the input image and a threshold.

The threshold may adaptively vary based on the size information of the input image.

The liveness test may fail in receiving a verification, in response to the estimated blur of the input image being greater than or equal to the threshold. The liveness test may succeed in receiving the verification, in response to the estimated blur of the input image being less than the threshold.

The one or more processors may be further configured to correct the blur of the input image by combining the size information of the input image and the estimated blur of the target image.

The one or more processors may be further configured to estimate the blur of the input image using a blur estimation model based on a neural network.

In another general aspect, an apparatus with user verification includes: a camera configured to capture an input image; and one or more processors configured to: resize the input image to generate a target image of a preset size different from a size of the input image; estimate a blur of the target image; estimate a blur of the input image based on the size of the input image, the preset size, and the estimated blur of the target image; perform a liveness test on the input image based on the estimated blur of the input image; and perform the user verification based on a result of the liveness test.

The preset size may be smaller than the size of the input image, and each of the preset size and the size of the input image may be a resolution.

The estimating of the blur of the input image based on the size of the input image, the preset size, and the estimated blur of the target image may include: estimating the blur of the input image by determining a ratio between the size of the input image and the size of the target image; and applying the determined ratio to the estimated blur of the target image.

The performing of the liveness test on the input image based on the estimated blur of the input image may include comparing the estimated blur of the input image to a threshold.

The performing of the user verification based on the result of the liveness test may include: failing to verify a user inputting the input image, in response to the estimated blur of the input image being greater than or equal to the threshold; or verifying the user inputting the input image, in response to the estimated blur of the input image being less than the threshold.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
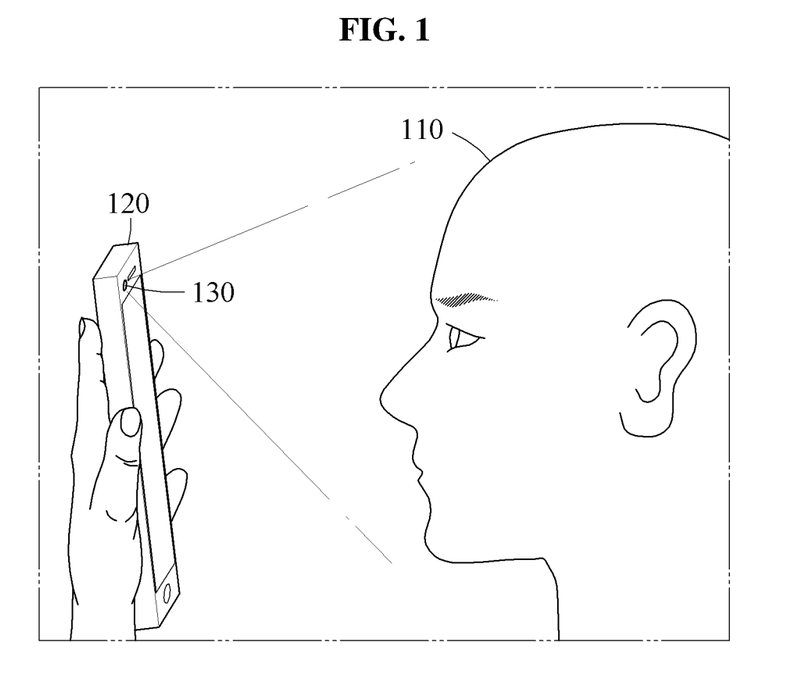
FIGS. 1 and 2 illustrate examples of a liveness test through blur estimation.
Figure 2:
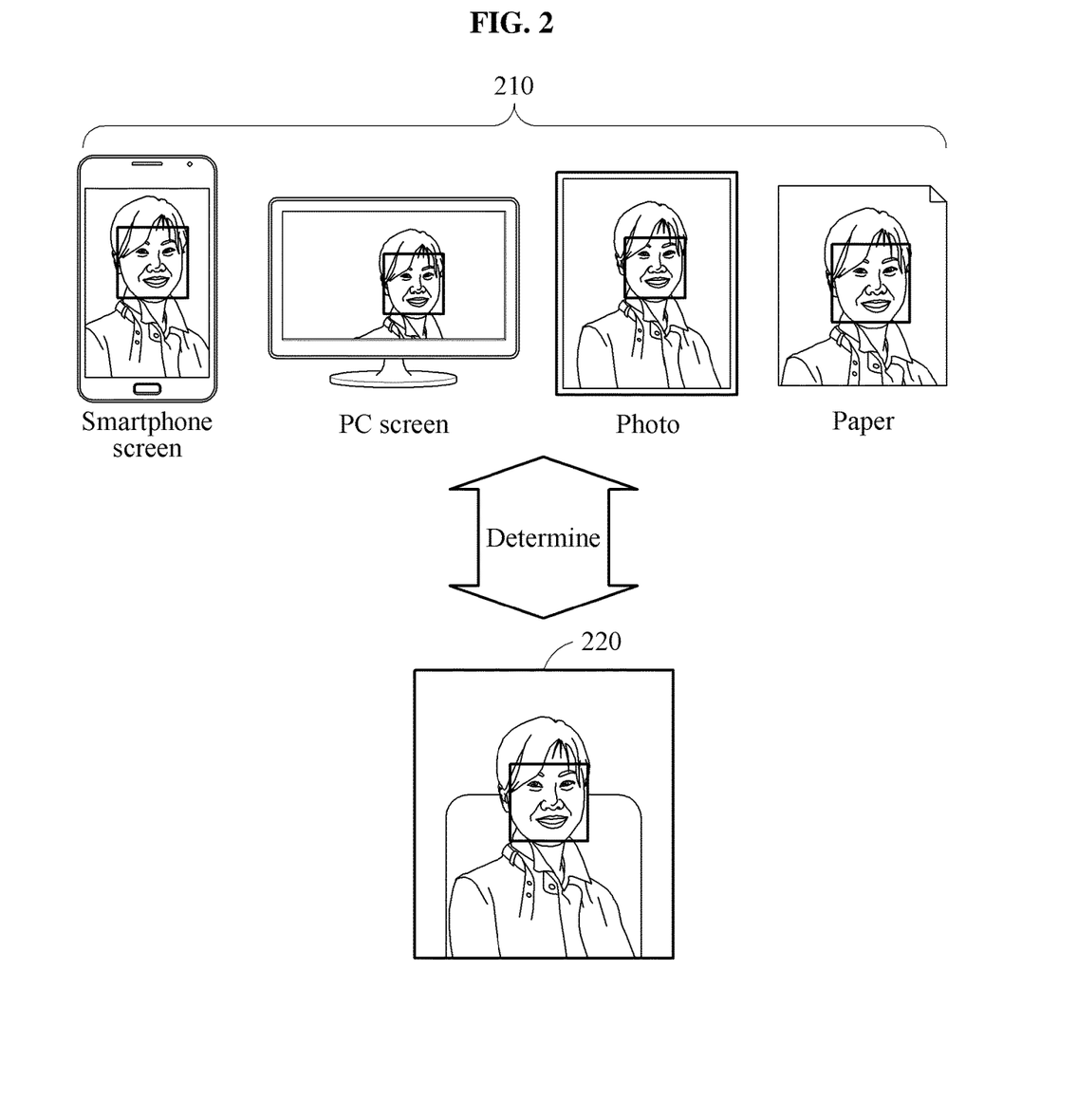

FIGS. 1 and 2 illustrate examples of a liveness test through blur estimation.

A liveness test relates to inspecting whether a test subject is a living object, for example, determining whether a face included in an image captured through a camera is a true face or a fake face of a human. In an example, the liveness test may be used to inspect a liveness of a verification subject that is identical to the test subject in association with a user verification performed for a user login, a payment service, or an access control. The liveness test may be used for a user verification system to distinguish a non-living object, for example, a photo, paper, an image, or a model used as a fake method, from a living object, for example, a living person.

An invalid user may attempt to trigger a false acceptance of the user verification system using spoofing techniques. For example, in a face verification, an invalid user may provide a camera with a color photo or a video including a face of a valid user, or a mask or a model that depicts the face of the valid user to trigger a false acceptance of the invalid user. The liveness test serves to prevent the false acceptance by filtering output an acceptance attempt, that is, a spoofing attack, using a replacement for the living object, such as the photo, the video, the mask, or the model. When the verification subject is determined to be a non-living object as a result of the liveness test, a user verification stage may not proceed. Alternatively, a final user verification may be determined to be a failure regardless of a result of the user verification.

FIG. 2 illustrates examples of a fake face 210 and a true face 220. A liveness test apparatus that performs a liveness test may identify the true face 220 in a test subject image captured from a true user face and may distinguish the fake face 210 in a test subject image, for example, a user face displayed on a smartphone screen or a PC screen, a user face included in a photo, or a user face printed on paper. The liveness test apparatus may include a blur estimation apparatus that performs a blur estimation on an input image.

In a user terminal such as a smartphone, a focal distance may be fixed. Therefore, a blur of the input image may be estimated and a face included in the input image may be determined to be a true face or a fake face due to an erroneous application of the estimated blur. A liveness test is performed based on the blur of the input image.

For example, when a fake face included in a photo or a video is captured using a smartphone having a fixed focal distance, the fake face may be recognized as a true face due to an erroneous application of a blur estimated from the captured image. Alternatively, when a true face is captured using a user terminal, the true face may be recognized as a fake face due to an erroneous application of a blur estimated from the captured image.

Referring to FIG. 1, the blur estimation apparatus may be included in a computing apparatus 120. For example, the computing apparatus 120 may be a smartphone, a wearable device, a tablet computer, a netbook, a laptop, a desktop, a personal digital assistant (PDA), a set-top box, an electronic device, a biometric door lock, a security device, or a vehicle starting device.

In an example, a user 110 may attempt a user verification with respect to the computing apparatus 120 through a face verification. For example, when the user 110 attempts the face verification with respect to the computing apparatus 120 to unlock a locked state of the computing apparatus 120, the computing apparatus 120 may acquire a face image of the user 110 using a camera 130, analyze the acquired face image, and determine whether to unlock the locked state of the computing apparatus 120. If the user verification succeeds, the computing apparatus 120 may release (unlock) the locked state and allows an access of the user 110. In contrast, when the user verification fails, the computing apparatus 120 may continue to operate in the locked state.

As another example, when the user 110 performs a face verification in the computing apparatus 120 to perform a payment service using the computing apparatus 120, the computing apparatus 120 may acquire the face image of the user 110. When the user 110 is verified as a legitimate user as a result of analyzing the face image, the computing apparatus 120 may accept a payment request and, otherwise, may reject the payment request.

In an example, in the user verification process, the blur estimation may be performed by the blur estimation apparatus before or after a user verification result is determined, and the liveness test apparatus may perform a liveness test to determine whether an object of the user verification is a living object. When the verification subject is determined to be a living object and the user 130 is verified as a legitimate user as a result of the liveness test, the computing apparatus 120 may release, that is, unlock the locked state, or the computing apparatus 120 may accept the payment request. In contrast, when the verification subject is determined to be a non-living object or not recognized as a legitimate user, the computing apparatus 120 may continue to operate in the locked state or may reject the payment request. That is, in a case in which the user verification process is performed before the liveness test process, if it is determined that a result of the user verification is a success and a result of the liveness test is a failure, that is, if the verification subject is determined to be a non-living object, a final result of the user verification may be determined to be a failure.

The liveness test apparatus may use a liveness test model implemented by a neural network to perform a liveness test. The liveness test model may provide score information indicating a probability that a test subject corresponds to a true face or a fake face based on input data. In an example, if a score acquired from the liveness test model is greater than a threshold, the liveness test apparatus may determine the test subject to be the true face. In contrast, if the score acquired from the liveness test is less than or equal to the threshold, the liveness test apparatus may determine the test subject to be the fake face.

Figure 3:
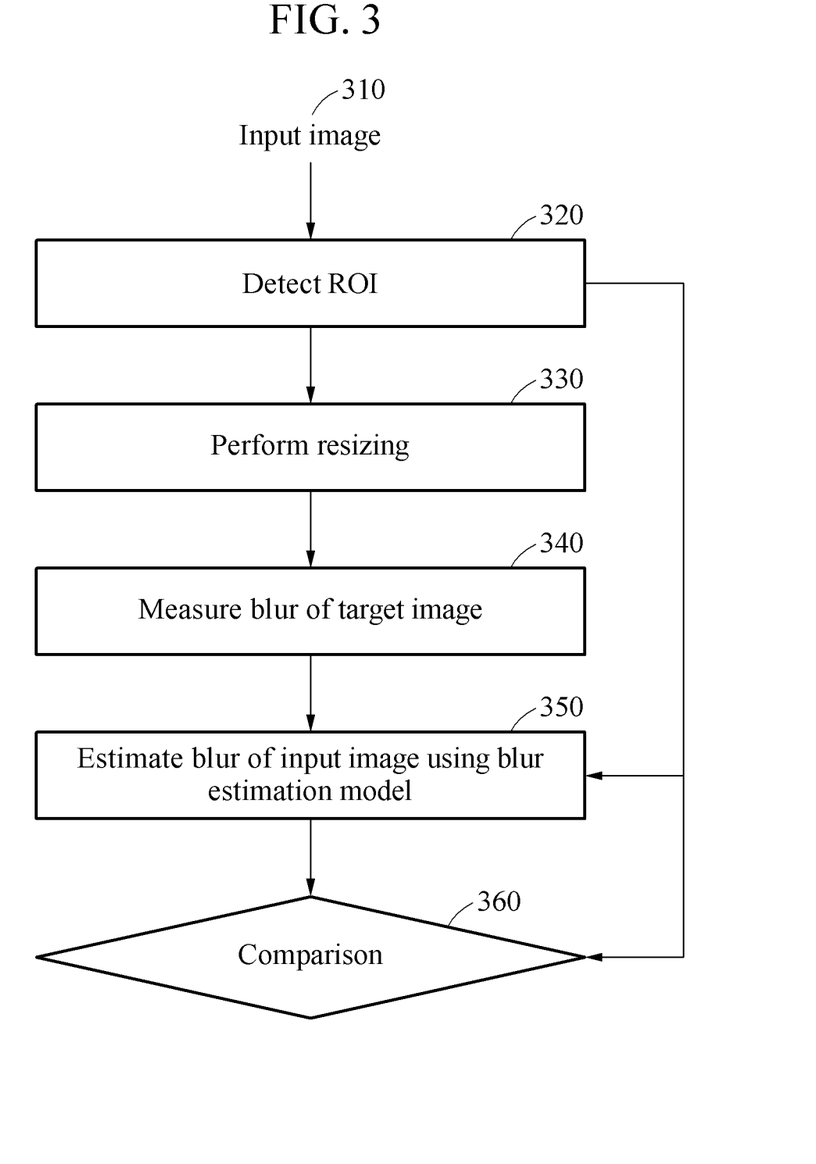
FIG. 3 is a flowchart illustrating an example of a blur estimation method.

FIG. 3 is a flowchart illustrating an example of a blur estimation method. A blur estimation apparatus may perform the blur estimation method. The blur estimation apparatus may be included in a liveness test apparatus.

Referring to FIG. 3, in operation 310, the blur estimation apparatus may identify an input image. The input image may be an image obtained for blur estimation and may be acquired by an image capturing apparatus, for example, a digital camera or a video camera. The image capturing apparatus may be included in the blur estimation apparatus or may be an apparatus separate from the blur estimation apparatus.

In operation 320, the blur estimation apparatus may detect a region of interest (ROI) in the identified input image. The ROI may include, for example, a facial region. The blur estimation apparatus may detect the facial region in the input image using a trained neural network, a Haar-based cascade Adaboost classifier, or a Viola-Jones detector. The foregoing detection schemes are provided as examples only, and the blur estimation apparatus may detect the facial region in the input image using various facial region detection schemes. For example, the blur estimation apparatus may detect facial landmarks in the input image and may also detect a bounding region including the detected facial landmarks as a facial region.

The blur estimation apparatus may acquire size information corresponding to the facial region detected in the input image. For example, the blur estimation apparatus may detect the facial region in the input image and may acquire size information of the detected facial region.

In operation 330, the blur estimation apparatus may resize the detected facial region. For example, the blur estimation apparatus may resize the detected facial region to generate a target image of a preset size. The preset size may be determined in advance based on performance of a computing apparatus (e.g., the computing apparatus 120) including the blur estimation apparatus. For example, if the facial region detected in the input image has a size of 640×480, the blur estimation apparatus may generate a target image in which the size of the facial region is resized to a preset size of 128×128. The size may be a resolution.

In operation 340, the blur estimation apparatus may measure a blur of the target image. The measured blur of the target image may differ from a blur of the input image. For example, the blur of the input image may be A and the blur of the target image may be B, which is different from A. That is, due to a size difference between the input image and the target image, the blur of the input image and the blur of the target image may differ from each other.

In operation 350, the blur estimation apparatus may estimate the blur of the input image based on the size information of the input image and the measured blur of the target image. The size information of the input image may be size information of the ROI. For example, when the facial region that is an ROI is detected in the input image, the blur of the input image may be estimated based on the size information of the detected facial region and the measured blur of the target image. The estimated blur of the input image may satisfy the following Equation 1.

$$b_{org} = (f(\text{Size}(I_{org}), b_{in}) \quad \text{Equation 1}$$

In Equation 1, $b_{in}$ is the blur of the target image measured in operation 340, $\text{Size}(I_{org})$ is a size of the ROI detected in the input image, and $b_{org}$ is the blur of the input image estimated in operation 350.

For example, the blur estimation apparatus may estimate the blur of the input image based on a ratio between the size information of the ROI detected in the input image and size information of the target image. For example, since the blur of the target image differs from the blur of the input image due to resizing, the blur of the input image may be estimated based on a ratio between the size of the target image and the size of the ROI. The size information of each of the ROI and the target image may include an area, a height, and a width, for example.

The blur estimation apparatus may use a neural network based blur estimation model. The blur estimation model may be implemented by, for example, a trained deep convolutional neural network (DCNN) model. The DCNN model may include a convolution layer, a pooling layer, and a fully connected layer, and may provide information input to the blur estimation model through an operation process performed by each layer. The DCNN model is provided as an example only. The liveness test model may be implemented by a neural network model in a different trained structure in addition to the DCNN model. For example, a recurrent neural network (RNN), a fully connected neural network, a bi-directional neural network, a restricted Boltzmann machine, or a neural network including different or overlapping neural network portions respectively with full, convolutional, recurrent, and/or bi-directional connections may be included used to implement the liveness test model.

In operation 360, the blur estimation apparatus compares the blur of the input image estimated in operation 350 with a threshold. The liveness test apparatus may perform a liveness test on the input image based on a comparison result of operation 360. For example, if the estimated blur of the input image is greater than or equal to the threshold, the liveness test may fail in receiving a verification. Alternatively, if the estimated blur of the input image is less than the threshold, the liveness test may succeed in receiving the verification.

The threshold may adaptively vary. That is, the threshold may adaptively vary without being fixed. For example, the threshold may be an adaptively varying value, not a fixed value, based on a ratio between size information of the ROI detected in the input image and size information of the target image.

In an example, if the size of the input image is relatively large, the size of the input image may cause a degradation in an efficiency of a memory and a speed in performing blur estimation. Therefore, by resizing the input image to generate the target image, by estimating the blur of the target image, and by correcting the estimated blur based on size information of the input image, it is possible to enhance the efficiency of the memory and the speed of performing the blur estimation.

Figure 4:
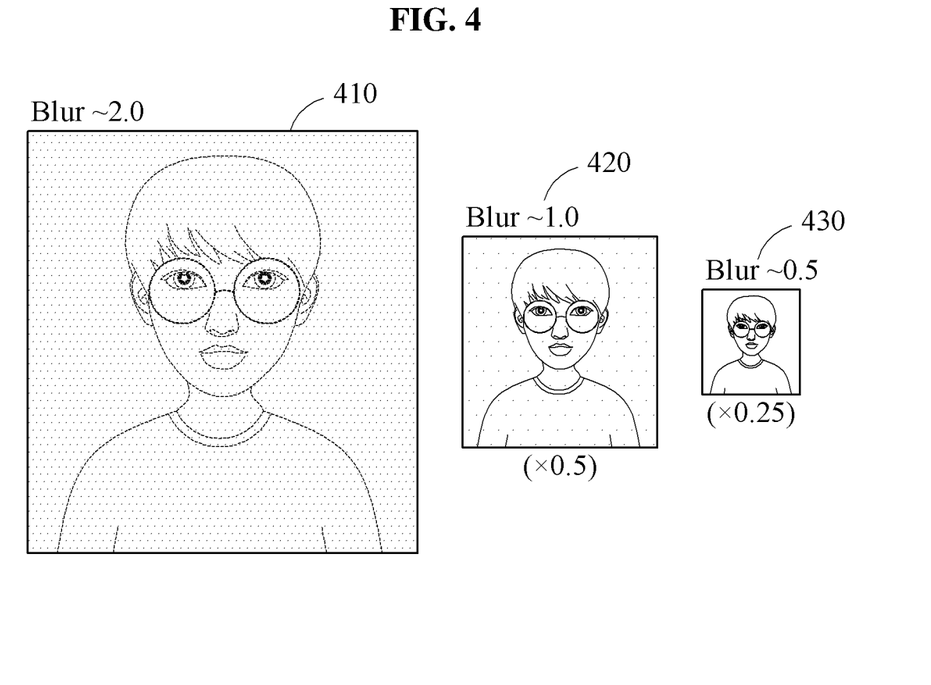
FIG. 4 illustrates an example of a change in a blur according to resizing of an input image.

FIG. 4 illustrates an example of a change in a blur according to resizing of an input image.

Referring to FIG. 4, in a picture 410, a facial region that is an ROI is detected in an input image and a blur is 2.0. In a picture 420, the detected facial region (ROI) is resized to generate a target image with a size of 0.5 times a size of the input image and a blur is 1.0. In a picture 430, the detected facial region (ROI) is resized to generate a target image of 0.25 times a size of the detected facial region (ROI) and a blur is 0.5. That is, although the input images in the pictures 410, 420, and 430 are all images of the same facial region, the respective blurs of the input images are different depending on sizes.

In an example in which a threshold is 1.5, a liveness test result for the picture 410 in which the blur is greater than or equal to the threshold may differ from liveness test results for the pictures 420 and 430 in which the respective blurs are less than the threshold.

To compensate for such a different result, the blur estimation apparatus may estimate the blur of the ROI detected in the input image based on the ratio between the size of the target image and the size of the ROI. In addition, the blur estimation apparatus may determine a blur level of the input image based on the threshold that adaptively varies based on a size of the detected ROI, and the liveness test apparatus may perform the liveness test based on the determination result.

Figure 5:
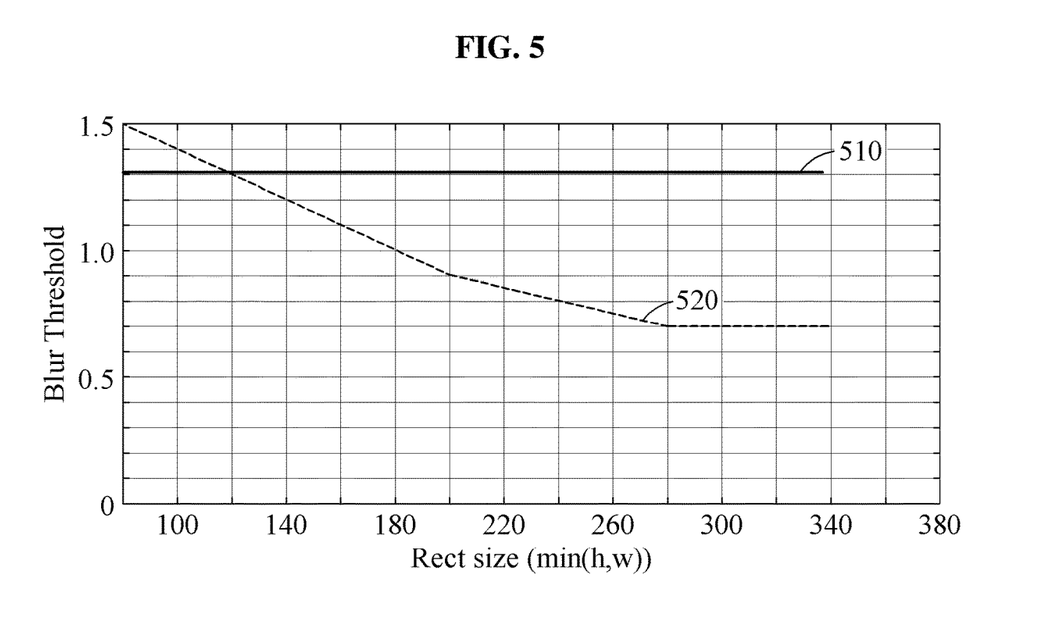
FIG. 5 is a graph showing an example of a fixed threshold and an adaptively varying threshold.

FIG. 5 is a graph showing an example of a fixed threshold and an adaptively varying threshold. In FIG. 5, a y axis is a threshold and an x axis is a size (height, width) of a facial region detected in an input image. The height and the width of the x axis are provided as an example only and another index that enables comparing the size of the input image with the size of the target image may be included.

A graph 510 corresponds to an example in which the threshold is fixed to 1.3 and a graph 520 shows an example in which the threshold adaptively varies as shown in the following Equation 2.

$$\begin{array}{ll} 1.5 - \left(\dfrac{1}{200}\right)(x - 80) & (80 \le x < 200) \\ 0.9 - \left(\dfrac{1}{400}\right)(x - 200) & (200 \le x < 280) \\ 0.7 & (280 < x) \end{array} \quad \text{Equation 2}$$

For example, if the blur of the target image 1.24, the input image may be determined to include non-blur based on the graph 510 in which the fixed threshold is 1.5. As another example, when x=250, the input image may be determined to include a blur based on the graph 520 in which the adaptive varying threshold is 0.775 as determined by Equation 2.

Figure 6:
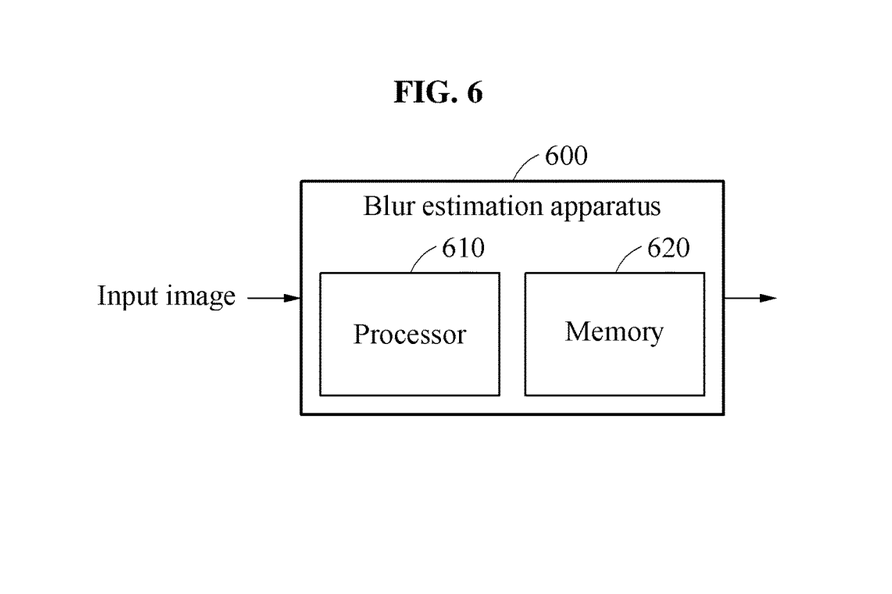
FIG. 6 illustrates an example of a blur estimation apparatus.

FIG. 6 illustrates an example of a blur estimation apparatus.

Herein, a liveness test apparatus may analyze a liveness of a test subject included in an input image and may output a test result. The liveness test apparatus may perform at least one operation described or illustrated herein in association with the liveness test and may provide the user with a liveness test result.

Referring to FIG. 6, a blur estimation apparatus 600 may be included in the liveness test apparatus and the liveness test apparatus may inspect the liveness of the test subject based on a result of the blur estimation apparatus 600.

As shown in FIG. 6, the blur estimation apparatus 600 may include at least one processor 610 and a memory 620. The memory 620 connects to the processor 610 and stores instructions executable by the processor 610, data to be applied in operations performed by the processor 610, and/or data processed by the processor 610.

The processor 610 may perform at least one operation associated with the blur estimation described above with reference to FIGS. 1 to 5. For example, the processor 610 may resize an input image of which a blur is to be estimated to generate a target image, may determine a blur of the target image, and may estimate a blur value based on size information of the input image. The processor 610 may determine whether the input image is a non-blurred or blurred based on the estimated blur value, and the liveness test apparatus may derive different results for non-blur and blur.

In one example, if a size of the input image is large, an efficiency of a memory and a speed may be degraded in blur estimation. Therefore, by resizing the input image to the target image, by estimating a blur of the target image, and by correcting the estimated blur based on size information of the input image, the efficiency of the memory and the speed may be improved.

Figure 7:
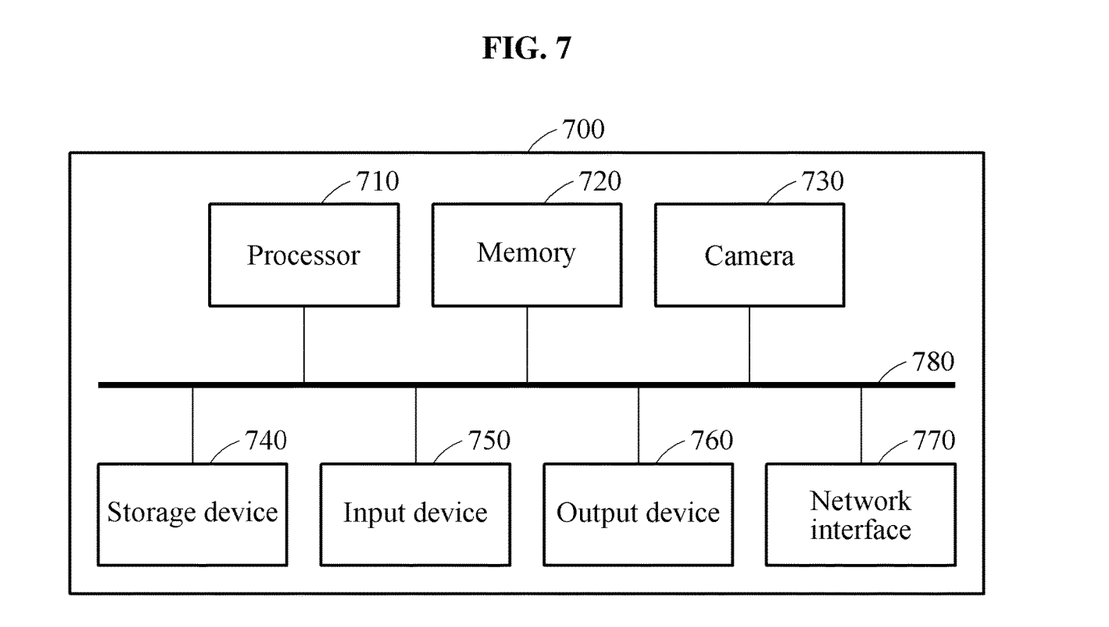
FIG. 7 illustrates an example of a computing apparatus.

FIG. 7 illustrates an example of a computing apparatus 700.

Referring to FIG. 7, the computing apparatus 700 may estimate a blur of an input image and may perform a liveness test and/or a user verification of a test subject. The computing apparatus 700 may correspond to the computing apparatus 120 of FIG. 1 and may perform the functionality of the estimation apparatus 600 of FIG. 6.

Referring to FIG. 7, the computing apparatus 700 may include at least one processor 710, a memory 720, a camera 730, a storage device 740, an input device 750, an output device 760, and a network interface 770. The processor 710, the memory 720, the camera 730, the storage device 730, the input device 750, the output device 760, and the network interface 770 may communicate with one another through a communication bus 780.

The processor 710 may execute a function and instructions for performing the blur estimation and/or the liveness test and/or the user verification. For example, the processor 710 may process instructions stored in the memory 720 or the storage device 740. The processor 710 may perform one or more operations described above with respect to FIGS. 1 to 6.

The memory 720 may store information used to perform the blur estimation and/or the liveness test and/or the user verification. The memory 720 may include a computer-readable storage medium or a computer-readable storage device. The memory 720 may store information required for performing the liveness test and instructions executable by the processor 710.

The camera 730 may capture either one or both of a still image and a video image including a subject of the blur estimation and/or the liveness test and/or the user verification. The image acquired, that is, captured by the camera 730 may correspond to the input image described herein.

The storage device 740 may include a computer-readable storage medium or a computer-readable storage device. In an example, the storage device 740 may store a greater quantity of information than the memory 720 and may store the information for a long period of time. For example, the storage device 740 may include a magnetic hard disc, an optical disc, a flash memory, electrically programmable memory (EPROM), a floppy disk, or another type of a non-volatile memory.

The input device 750 may receive an input from the user through tactile, video, audio, or touch input, for example. For example, the input device 750 may include another device configured to detect an input from a keyboard, a mouse, a touch screen, a microphone, or the user, and to forward the detected input to the computing apparatus 700.

The output device 760 may provide the user with an output of the computing apparatus 700 through a visual channel, an auditory channel, or a tactile channel. For example, the output device 760 may include a display, a touchscreen, a speaker, a vibration generation apparatus, or another device capable of providing an output to the user. The network interface 770 may communicate with an external device through a wired network or a wireless network.

The blur estimation apparatuses, the blur estimation apparatus 600, the liveness test apparatuses, the computing apparatuses, the computing apparatuses 120 and 700, the processors 610 and 710, the memories 620 and 720, the network interface 770, and the communication bus 780 in FIGS. 1-7, and other apparatuses, units, modules, devices, and components described herein are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with blur estimation, comprising:
    acquiring size information of an input image;
    detecting a region of interest (ROI) in the input image;
    resizing the ROI to generate a target image of a preset size;
    estimating a blur of the target image; and
    estimating a blur of the input image based on the estimated blur of the target image and the size information of the input image.

2. The method of claim 1, wherein the acquiring of the size information of the input image comprises acquiring size information of the ROI in the input image.

3. The method of claim 1, wherein the estimating of the blur of the input image comprises correcting the blur of the input image based on a ratio between the size information of the input image and size information of the target image.

4. The method of claim 3, wherein each of the size information of the input image and the size information of the target image comprises an area, a height, and a width.

5. The method of claim 1, further comprising:
    performing a liveness test on the input image based on a result of a comparison between the estimated blur of the input image and a threshold.

6. The method of claim 5, wherein the threshold adaptively varies based on the size information of the input image.

7. The method of claim 5,
    wherein, in response to the estimated blur of the input image being less than the threshold, a result of the liveness test is that the input image represents a live image, and
    wherein, in response to the estimated blur of the input image being greater than or equal to the threshold, the result of the liveness test is that the input image does not represent the live image.

8. The method of claim 1, wherein the ROI includes a facial landmark for each of plural discrete portions of a face.

9. The method of claim 1, wherein the estimating of the blur of the input image comprises estimating the blur of the input image using a blur estimation machine learning model.

10. A non-transitory computer-readable recording medium storing instructions that, when executed by a processor, cause the processor to perform the method of claim 1.

11. The method of claim 9, wherein the blur estimation machine learning model is a blur estimation neural network.

12. An apparatus with blur estimation, comprising:
a memory storing computer-readable instructions; and
one or more processors,
wherein, in response to the instructions being executed by the one or more processors, the one or more processors are configured to:
acquire size information of an input image;
detect a region of interest (ROI) in the input image;
resize the ROI to generate a target image of a preset size;
estimate a blur of the target image; and
estimate a blur of the input image based on the estimated blur of the target image and the size information of the input image.

13. The apparatus of claim 12, wherein the one or more processors are further configured to acquire the size information of the input image by acquiring size information of the ROI in the input image.

14. The apparatus of claim 12, wherein the processor is further configured to estimate the blur of the input image by correcting the blur of the input image based on a ratio between the size information of the input image and size information of the target image.

15. The apparatus of claim 14, wherein each of the size information of the input image and the size information of the target image comprises an area, a height, and a width.

16. The apparatus of claim 14, wherein the estimating of the blur of the input image is further based on the preset size.

17. The apparatus of claim 12, wherein the one or more processors are further configured to perform a liveness test on the input image based on a result of a comparison between the estimated blur of the input image and a threshold.

18. The apparatus of claim 17, wherein the threshold adaptively varies based on the size information of the input image.

19. The apparatus of claim 17,
wherein, in response to the estimated blur of the input image being less than the threshold, a result of the liveness test is that the input image represents a live image, and
wherein, in response to the estimated blur of the input image being greater than or equal to the threshold, the result of the liveness test is that the input image does not represent the live image.

20. The apparatus of claim 12, wherein the ROI includes a facial landmark for each of plural discrete portions of a face.

21. The apparatus of claim 12, wherein the one or more processors are further configured to estimate the blur of the input image using a blur estimation machine learning model.

22. An apparatus with user verification, comprising:
a camera configured to capture an input image; and
one or more processors configured to:
detect a region of interest (ROI) in the input image;
resize the ROI to generate a target image of a preset size different from a size of the input image;
estimate a blur of the target image;
estimate a blur of the input image based on the size of the input image, the preset size, and the estimated blur of the target image;
perform a liveness test on the input image based on the estimated blur of the input image; and
perform the user verification based on a result of the liveness test.

23. The apparatus of claim 22, wherein the preset size is smaller than the size of the input image, and each of the preset size and the size of the input image is a resolution.

24. The apparatus of claim 22, wherein the estimating of the blur of the input image based on the size of the input image, the preset size, and the estimated blur of the target image comprises:
estimating the blur of the input image by determining a ratio between the size of the input image and the size of the target image; and
applying the determined ratio to the estimated blur of the target image.

25. The apparatus of claim 22, wherein the performing of the liveness test on the input image based on the estimated blur of the input image comprises comparing the estimated blur of the input image to a threshold.

26. The apparatus of claim 25, wherein, in the performing of the user verification based on the result of the liveness test,
in response to the estimated blur of the input image being greater than or equal to the threshold, a result of the user verification is that the user fails verification, and
in response to the estimated blur of the input image being less than the threshold, the result of the user verification is that the user is verified.

27. The apparatus of claim 25, wherein the threshold adaptively varies based on size information of the input image.

28. The apparatus of claim 22, wherein the size of the input image is an acquired size information of the ROI in the input image.

* * * * *